(12) United States Patent
Shibatani et al.

(10) Patent No.: US 8,281,269 B2
(45) Date of Patent: Oct. 2, 2012

(54) METHOD OF SEMICONDUCTOR INTEGRATED CIRCUIT DEVICE AND PROGRAM

(75) Inventors: Satoshi Shibatani, Tokyo (JP); Koki Tsurusaki, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 230 days.

(21) Appl. No.: 12/764,165

(22) Filed: Apr. 21, 2010

(65) Prior Publication Data

US 2010/0275168 A1   Oct. 28, 2010

(30) Foreign Application Priority Data

Apr. 24, 2009   (JP) .................... 2009-105770

(51) Int. Cl.
*G06F 17/50* (2006.01)
(52) U.S. Cl. ........ 716/111; 716/100; 716/102; 716/103; 716/104; 716/108; 716/112; 716/113; 716/119; 716/123; 716/124; 716/132
(58) Field of Classification Search .................. 716/100, 716/102, 103, 104, 108, 111, 112, 113, 119, 716/123, 124, 132
See application file for complete search history.

(56) References Cited

U.S. PATENT DOCUMENTS

| | | | | |
|---|---|---|---|---|
| 5,883,814 A * | 3/1999 | Luk et al. | ...... | 716/104 |
| 6,223,327 B1 * | 4/2001 | Yamaji | ...... | 716/111 |
| 6,553,557 B1 * | 4/2003 | Kataoka et al. | ...... | 716/103 |
| 6,701,493 B2 * | 3/2004 | Gasanov et al. | ...... | 716/112 |
| 6,845,494 B2 * | 1/2005 | Burks et al. | ...... | 716/108 |
| 6,865,721 B1 * | 3/2005 | Dahl et al. | ...... | 716/124 |
| 6,925,621 B2 * | 8/2005 | Mielke et al. | ...... | 716/103 |
| 7,032,207 B2 * | 4/2006 | Kurose et al. | ...... | 716/113 |
| 7,143,367 B2 * | 11/2006 | Eng | ...... | 716/102 |
| 7,155,694 B2 * | 12/2006 | Eichenseer et al. | ...... | 716/123 |
| 7,181,709 B2 * | 2/2007 | Tajika et al. | ...... | 716/114 |
| 7,430,725 B2 * | 9/2008 | Broberg et al. | ...... | 716/100 |
| 7,516,434 B2 * | 4/2009 | Okabe | ...... | 716/119 |
| 7,536,658 B2 * | 5/2009 | Kwon et al. | ...... | 716/104 |
| 7,937,682 B2 * | 5/2011 | Arunachalam et al. | ...... | 716/132 |
| 2008/0216026 A1 * | 9/2008 | Gotou | ...... | 716/2 |
| 2011/0022998 A1 * | 1/2011 | Rao et al. | ...... | 716/108 |

FOREIGN PATENT DOCUMENTS

JP   2006-338090 A   12/2006

* cited by examiner

*Primary Examiner* — Helen Rossoshek
(74) *Attorney, Agent, or Firm* — Miles & Stockbridge P.C.

(57) ABSTRACT

An object of the present invention is to largely reduce a period required for a layout design of a semiconductor integrated circuit device by simplifying a hierarchical layout process. It is necessary to couple a signal line between a circuit belonging to a top and a signal terminal of a block, and there is such an inadequate situation that the signal line cannot be coupled to a predetermined location of the signal terminal of the block or the signal line needs to be largely detoured depending on congestion conditions of the other signal lines in the block and the signal lines of the top coupled to the other blocks. Accordingly, location information of the signal terminal is deleted before the signal line is coupled, so that the signal line can be coupled irrespective of the location information of the signal terminal of the block. Further, the signal line can be optimally coupled in some cases by arranging the circuit of the top on the inner side relative to a boundary of the block, so that location information of the boundary of the block as well as the location information of the signal terminal is deleted.

5 Claims, 9 Drawing Sheets

METHOD OF SEMICONDUCTOR INTEGRATED CIRCUIT DEVICE AND PROGRAM

CROSS-REFERENCE TO RELATED APPLICATIONS

The disclosure of Japanese Patent Application No. 2009-105770 filed on Apr. 24, 2009 including the specification, drawings and abstract is incorporated herein by reference in its entirety.

BACKGROUND OF THE INVENTION

The present invention relates to a design technique of a semiconductor integrated circuit device, and particularly to a technique useful for an optimization process of a layout process in a semiconductor integrated circuit device.

As a layout design technique of a semiconductor integrated circuit device, for example, a hierarchical design, a timing budget, and the like are widely known. The hierarchical design method is a technique by which a layout is designed by separating a plurality of low-order hierarchies (blocks) with a circuit scale operated by an automatic layout tool from a high-order hierarchy (top) that organizes these blocks.

In the hierarchical design method, the layouts of the top and the block are separately optimized as shown in, for example, FIG. 9. In every step, timing, congestion states, and the like are confirmed using all data, and an error in a timing estimation between the top and the block found at the time of the confirmation and a floorplan generated due to the error are amended.

As a layout design technique of a semiconductor integrated circuit device of this kind, there is known a technique in which when the entire chip is divided into a top and a plurality of blocks to perform arrangements of these blocks and wiring in these blocks, a semiconductor integrated circuit device is designed by using a block ILM which extracts data (logical data, physical data, and RC data) that belong to a block different from its own block and are associated with input and output of signals for its own block (for example, refer to Japanese Unexamined Patent Publication No. 2006-338090).

SUMMARY OF THE INVENTION

However, the inventors found the following problems in such a design technique of a semiconductor integrated circuit device.

FIG. 10 is an explanatory diagram for showing the problem caused when the layouts of a top TP and a block BK are separately processed.

In FIG. 10, clock generators 100 and 101 are those located in the top TP, and clock tree buffers 102 to 107 are those estimated on the basis of a delay and physical information.

Further, an 'estimation' indicates the timing of a path estimated on the basis of the physical information, and 'Y' and 'Z' indicate delay values estimated on the basis of the 'estimation' and the clock tree buffers 102 to 107.

'Set_input_delay Y-clock clk1' and 'set_input_delay Z-clock clk2' indicate settings of input delay values (timing constraints) estimated on the basis of the 'estimation'. 'Create_clock clk1' and 'create_clock clk2' indicate clock definitions for a block layout (timing constraints). Here, "(with clock propagated mode)" is an explanatory note that means a case that a clock delay is calculated.

'X1' and 'X2' indicate delay values estimated by the clock tree buffers. 'Set_clock_latency-clk clk1-source X1' indicates an estimated clock delay (a timing constraint and a delay from the clock generator 100), and 'set_clock_latency-clk clk2-source X2' indicates an estimated clock delay (a timing constraint and a delay from the clock generator 101).

Further, 'Fixed Pin locations' indicates pin locations determined on the basis of the estimation of the physical information, and the pin locations determined on the basis of the estimation are always fixed without changes.

The flowing problems arise in the case where the layouts of the top TP and the block BK are separately processed as described above.

(1) The timing optimization of the block (processes in "production of partition and budgeting" and "block-level P&R" of FIG. 9) is dependent on boundary conditions (pin locations and timing) on the basis of the timing estimation. The pin locations are fixed at locations indicated by 'Fixed Pin Locations' of FIG. 10.

Further, as the 'estimation' of FIG. 10, the delay values of the 'set_input_delay Y-clock clk1' and the 'set_input_delay Z-clock clk2' and the clock delay values X1 and X2 correspond to the timing on the basis of the 'estimation', and the optimization of the block is determined by the boundary conditions on the basis of the estimation.

(2) In the timing optimization of the top (a process of "top-level P&R" of FIG. 9), the shape of the block, the block pin locations, and the paths in the block cannot be changed. Accordingly, the block frame (shape), the block pin locations (Fixed Pin locations) and the paths indicated by the "estimation" in the block in FIG. 10 cannot be changed in the timing optimization of the top.

(3) Enhancing the accuracy of an initial estimation value requires optimization by a process in which a long processing time and large memory usage are required and by a manual operation (a process of "production of partition and budgeting" of FIG. 9).

For example, in order to enhance the accuracy of the timing and locations of the paths indicated by the 'estimation' of FIG. 10, various methods are used. However, optimization by a manual operation is generally performed.

(4) Since it is necessary to input all data necessary for the final verification in an initial timing budget, the memory usage and a processing time required for timing analysis are increased (processes of "production of partition and budgeting" and "re-budgeting" of FIG. 9).

An object of the present invention is to provide a technique for largely reducing a period required for a layout design of a semiconductor integrated circuit device by simplifying a hierarchical layout process.

The above and other objects and novel features of the present invention will become apparent from the description and the accompanying drawings of the present specification.

The followings are summarized descriptions of representative aspects of the present invention disclosed in this application.

The present invention provides a design method of a semiconductor integrated circuit device for designing a layout by dividing design data of the entire chip into design data of a top and design data of a plurality of blocks using an electronic system, the method including a boundary simultaneous optimization process in which the layout of a timing path used for timing optimization is designed only at boundaries between the top and the blocks.

Further, according to the present invention, the boundary simultaneous optimization process is performed in a state where circuits and signal lines belonging to the top are temporarily arranged or not arranged, and signal lines, the operation timing of circuits and arrangements in the blocks are optimized.

Further, according to the present invention, in order to couple a first signal line between the circuit belonging to the top and a signal terminal belonging to the block, the boundary simultaneous optimization process is performed in a state where location information of the signal terminal is deleted before the first signal line is coupled.

Further, according to the present invention, the boundary simultaneous optimization process is performed in a state where location information of the boundaries of the blocks is deleted.

Further, according to the present invention, in order to couple a second signal line between the signal terminal belonging to the block and the circuit belonging to the block, the boundary simultaneous optimization process is performed in a state where the location information of the signal terminal is deleted before the second signal line is coupled.

Further, the followings are summarized descriptions of the other aspects of the present invention disclosed in this application.

The present invention provides a program which allows an electronic system to design a layout by dividing design data of the entire chip into design data of a top and design data of a plurality of blocks, the program including the steps of: determining the shapes of blocks and pin locations on the basis of physical information comprised of arrangement locations of cells and signal line routes for coupling the cells, the physical information being estimated by using data such as a library in which a net list, a timing constraint, the shapes of the cells and timing are preliminarily defined at the full-chip level; producing a floorplan in the blocks on the basis of the physical information; estimating a timing constraint file for the layout in the blocks by estimating a path delay and assigning necessary timing information to the insides and outsides of the boundaries of the blocks on the basis of the physical information; generating arrangement and wiring information in the blocks from the floorplan in the blocks and the timing constraint file for the layout in the blocks; allowing layout data in the blocks included in the arrangement and wiring information to be included in the layout data of the full chip; deleting the boundaries of the blocks and the block pin locations from the physical information; activating timing paths which are traced in the blocks from a signal terminal existing in the layouts of the blocks and reach a flip-flop; activating the timing path which is critical in timing among those in the blocks that reach and are coupled to the flip-flop; inactivating the timing path other than the one that is critical in timing; and performing a simultaneous optimization process of the boundaries between the top and the blocks.

Further, according to the present invention, the step of generating a floorplan in the blocks on the basis of the physical information includes a step of deleting the required number of tracks for the signals lines of the top when the signal lines of the top pass through the block.

Further, according to the present invention, the step of generating a floorplan in the blocks on the basis of the physical information includes a step of setting a wiring prohibition area with a ratio obtained by dividing the number of signal lines by the number of available signal lines when the signal lines of the top pass through the blocks.

The followings are summarized effects obtained from the representative aspects of the present invention disclosed in this application.

(1) Since a processing time required for timing analysis can be reduced, a layout design of a semiconductor integrated circuit device can be efficiently performed.

(2) A period required for designing a semiconductor integrated circuit device can be reduced by the above (1).

DETAILED DESCRIPTION OF THE PREFERRED EMBODIMENT

Figure 1:
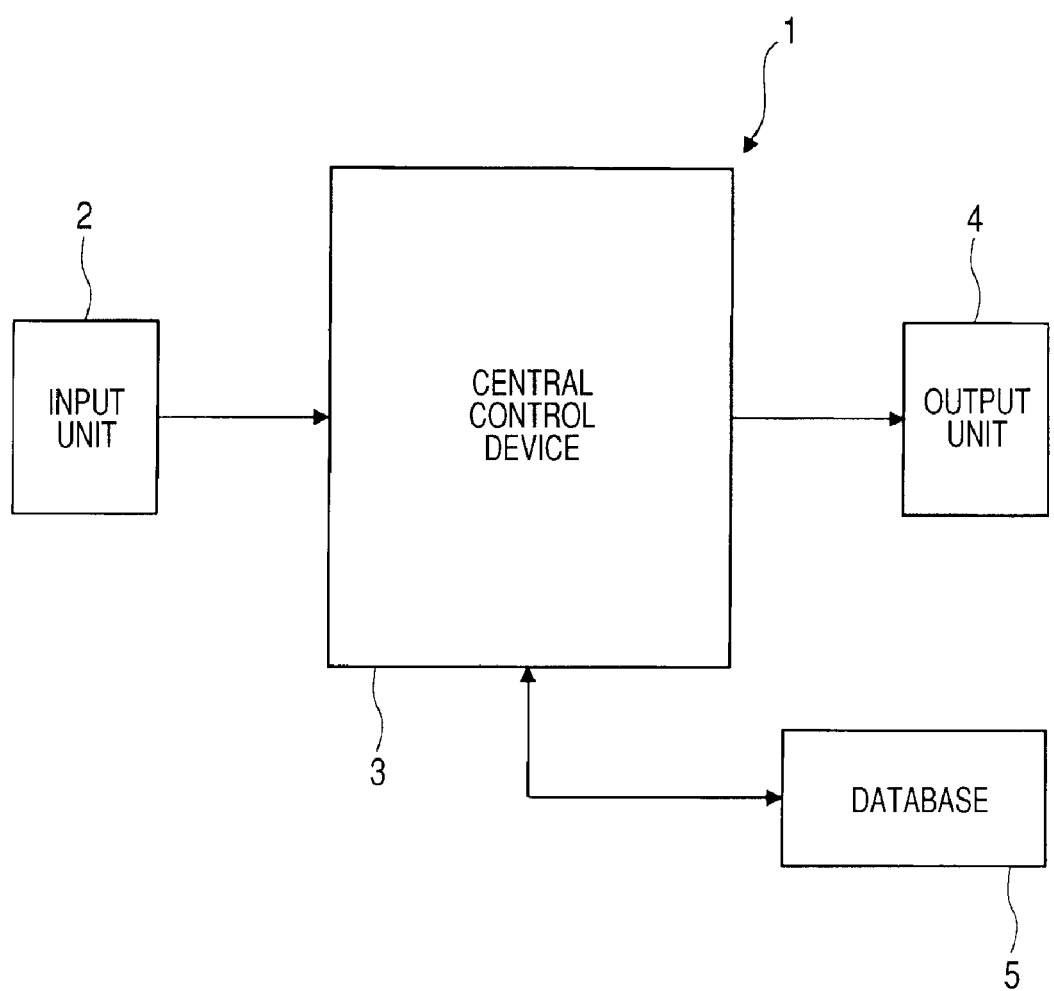
FIG. 1 is a block diagram for showing an example of an electronic system according to a first embodiment of the present invention.

Hereinafter, embodiments of the present invention will be described in detail on the basis of the drawings. It should be noted that in the all drawings for explaining the embodiments, the same reference numerals are given to the same units in principle, and the explanations thereof will not be repeated.

First Embodiment

Figure 2:
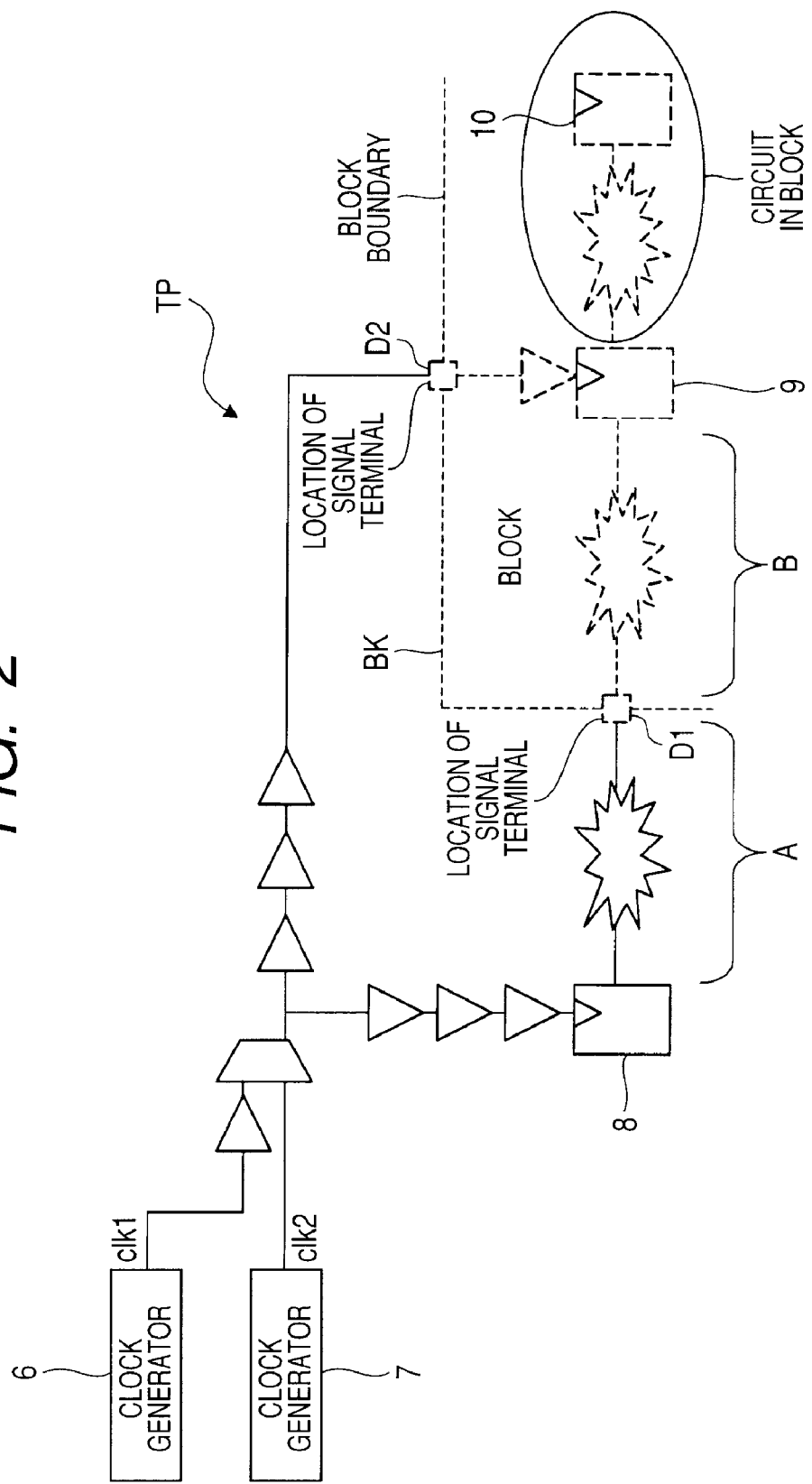
FIG. 2 is an explanatory diagram for explaining an example of simultaneous optimization of a boundary between a top and a block according to the first embodiment of the present invention.
Figure 3:
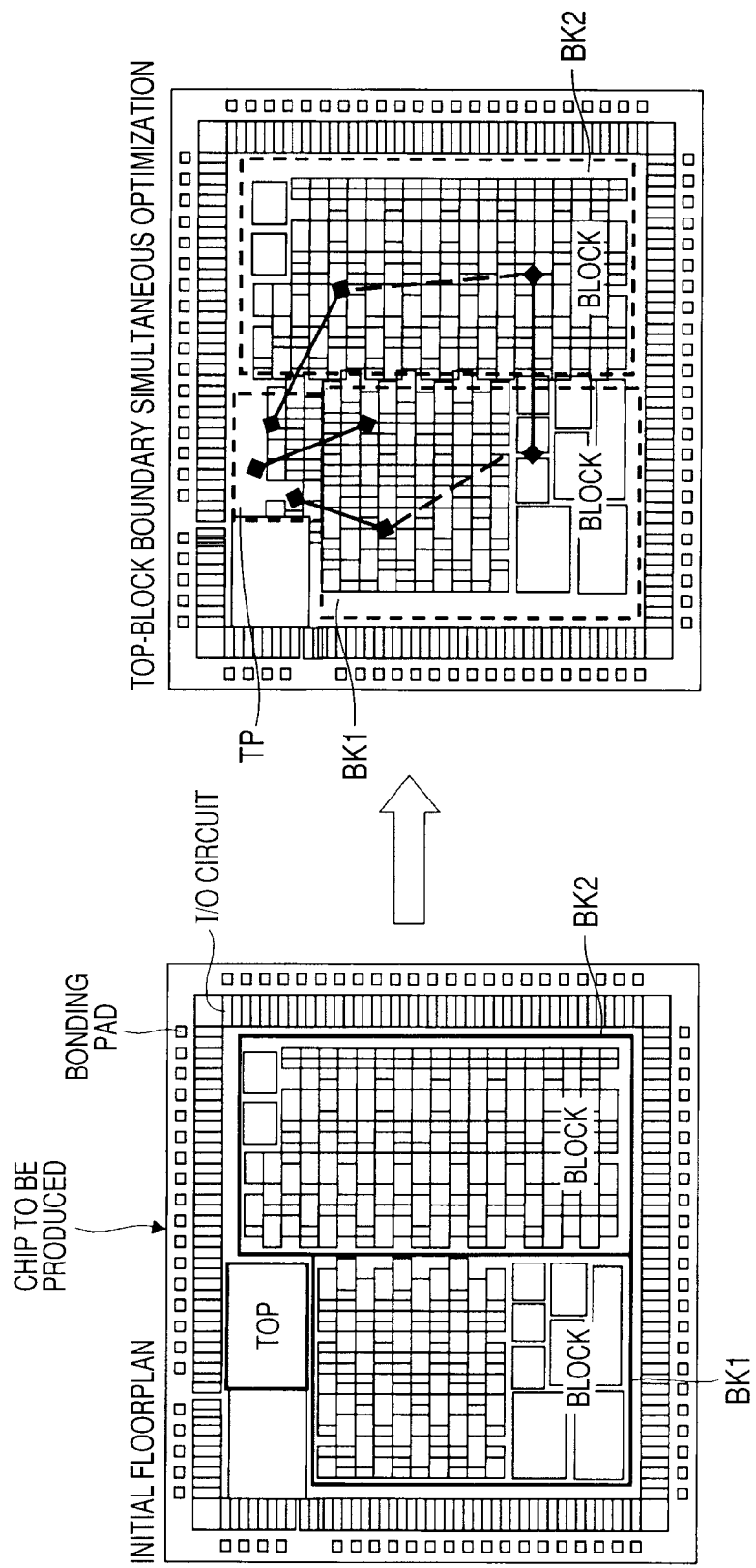
FIG. 3 is a schematic diagram for showing an example of a layout of the entire chip.
Figure 4:
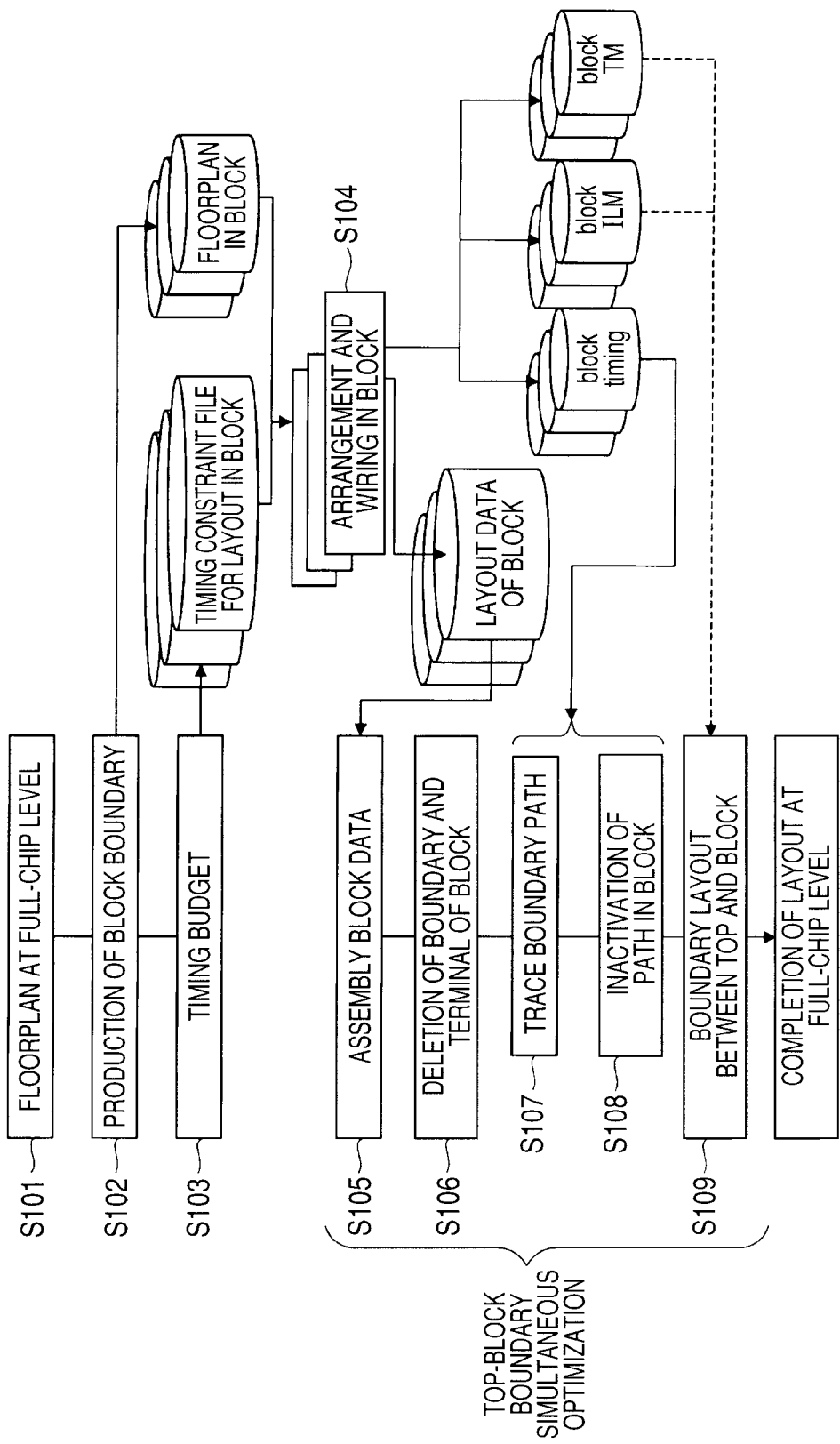
FIG. 4 is a flowchart for showing a processing example of a hierarchical layout in the first embodiment.
Figure 5:
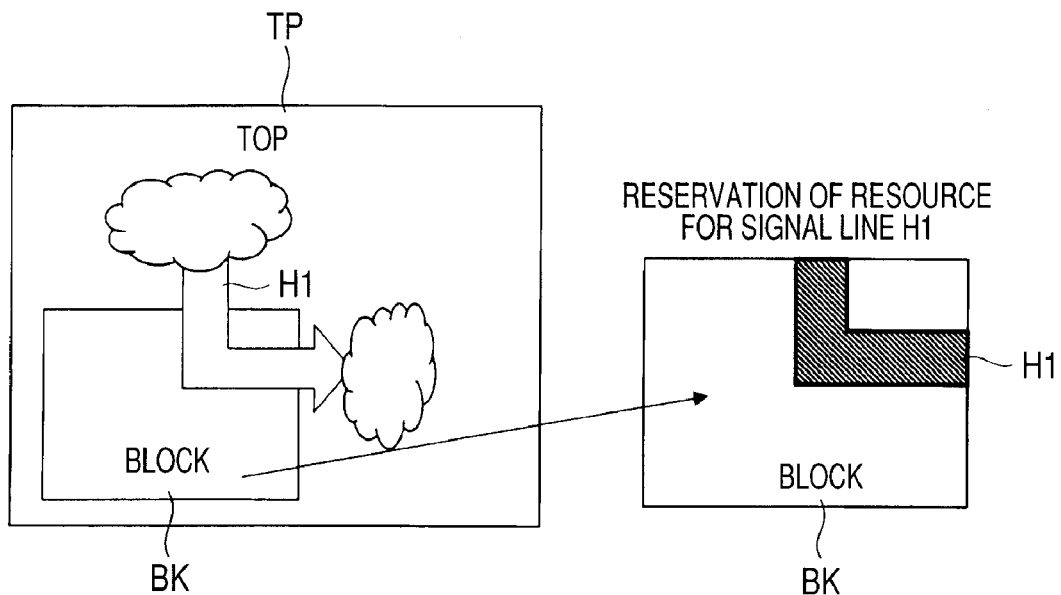
FIG. 5 is an explanatory diagram for showing an example of setting a top wiring resource.
Figure 6:
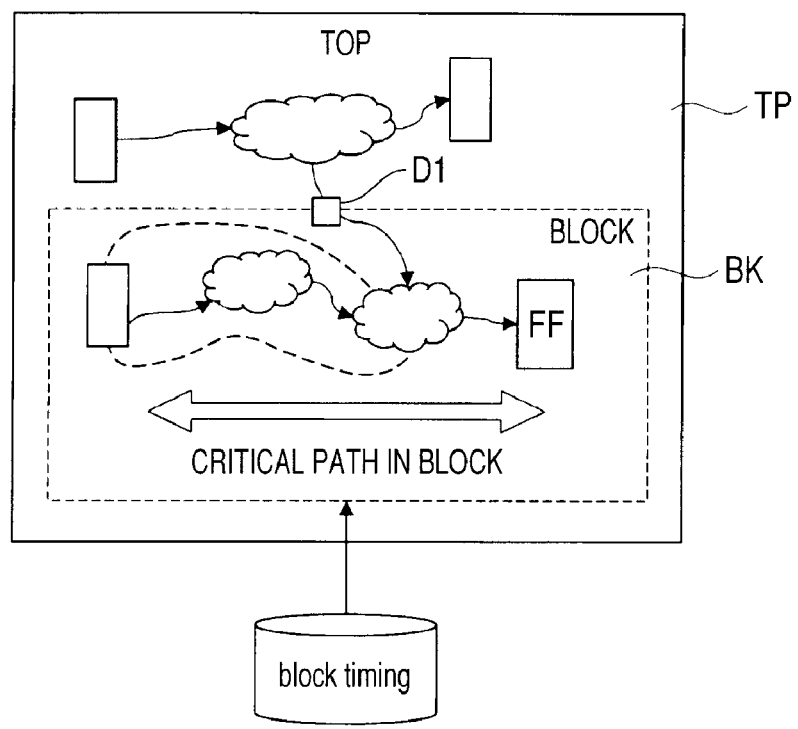
FIG. 6 is an explanatory diagram for showing an example of masking an unnecessary timing path in the block.

FIG. 1 is a block diagram for showing an example of an electronic system according to a first embodiment of the present invention. FIG. 2 is an explanatory diagram for explaining an example of simultaneous optimization of a boundary between a top and a block according to the first embodiment of the present invention. FIG. 3 is a schematic diagram for showing an example of a layout of the entire chip. FIG. 4 is a flowchart for showing a processing example of a hierarchical layout in the first embodiment. FIG. 5 is an explanatory diagram for showing an example of setting a top wiring resource. FIG. 6 is an explanatory diagram for showing an example of masking an unnecessary timing path in the block.

In the embodiment, a method of a hierarchical layout in a semiconductor integrated circuit device is processed by an electronic system 1 comprised of a computer system exemplified as a personal computer and a workstation.

The electronic system 1 includes an input unit 2, a central control device 3, an output unit 4, and a database 5 as shown in FIG. 1. The input unit 2 is a key board or the like capable of inputting various kinds of data, and the central control device 3 is coupled to the input unit 2.

The output unit 4 is comprised of a display and a printer. The output unit 4 displays data input from the input unit 2 or a result of an operation performed by the central control device 3, or outputs the data or the result in the form of hard copies. The database 5 stores therein data such as various layout information used for a hierarchical layout design in the semiconductor integrated circuit device.

In the first place, a basic concept of simultaneous optimization of a boundary between a top and a block will be described using FIG. 2 that is a circuit diagram for explaining an example of logical data of a block ILM.

In FIG. 2, it is assumed that circuits and signal lines belonging to the top hierarchy are temporarily arranged, and signal lines, operation timing of circuits, and arrangements (layouts) in the block are already optimized.

In FIG. 2, signal routes represented by the solid lines belong to a top TP that is the highest hierarchy, and a boundary, signal terminals D1 and D2, and signal routes represented by the dashed lines belong to a block BK that is a low-order hierarchy.

A clock generator 6 for generating a clock signal clk1, a clock generator 7 for generating a clock signal clk2, and a flip-flop 8 are provided in the top TP, and flip-flops 9 and 10 are provided in the block BK.

The clock signal clk1 or the clock signal clk2 is input to the flip-flop 8 or 9. Further, an output signal from the flip-flop 8 is input to the signal terminal D1 through a combinational logic, and then is input to the flip-flop 9 through another combinational logic.

In order to complete the layout designs of the top TP and the block BK, it is necessary to couple a signal line A as a first signal line between the circuit belonging to the top TP and the signal terminal D1 of the block BK. However, it is not necessarily adequate to couple the signal line A in such cases that the signal line A cannot be coupled to a predetermined location of the signal terminal of the block or the signal line A needs to be largely detoured due to congestion conditions of the other signal lines in the block BK or the signal lines of the top TP to be coupled to the other blocks BK.

Accordingly, location information of the signal terminal is deleted before the process of coupling the signal line A, so that the signal line A can be coupled irrespective of the location information of the signal terminal D1 of the block BK in the present invention.

Further, the signal line A can be optimally coupled in some cases by arranging the circuit belonging to the top TP on the inner side (namely, in the block BK) relative to the boundary of the block BK. Accordingly, the location information of the boundary of the block BK as well as the location information of the signal terminal is deleted.

In any one of the cases, a signal line B as a second signal line is also coupled between the signal terminal of the block BK and the circuit in the block BK at the same time as the signal line A. By coupling the signal line A and the signal line B at the same time, the coupling between the top TP and the block BK is optimized.

It is not necessary to move the block itself because the location of the block is preliminarily determined in accordance with a floorplan. Accordingly, the location information of the block BK is retained, and timing information in the block BK is inactivated because the information is not necessary for the coupling of the signal line A and the signal line B.

Accordingly, in the optimization process of the boundary portion between the top TP and the block BK for coupling the signal line A and the signal line B, reduction in memory usage and a processing time can be achieved by inactivating unnecessary data.

Further, it is possible to optimize the boundary portion between the top TP and the block BK in a state where the circuits and the signal lines belonging to the top hierarchy are not temporarily arranged (the location information is not determined).

FIG. 3 is a schematic diagram for showing an example of a layout of the entire chip in the above-described explanation.

In this case, for example, physical data (floorplan data and cell arrangement data) of the top TP and two blocks BK1 and BK2 are present as physical data of the entire chip, as shown on the left side of FIG. 3. As shown on the right side of FIG. 3, the routes represented by the solid lines denote the signal lines A and B, and the routes represented by the dashed lines denote the circuits and the signal lines in the blocks BK.

In addition to bonding pads and I/O circuits, the block BK1, the block BK2, and the top TP are preliminarily arranged in accordance with the floorplan. After boundary location information and terminal location information of the block BK1 and the block BK2 (and the top TP) are deleted, the boundary portions between the top TP and the blocks BK1 and BK2 are optimized.

Accordingly, the coupling between the top TP and the blocks BK1 and BK2, the coupling between the block BK1 and the block BK2, and the arrangement of the circuits belonging to the top TP can be performed irrespective of the boundary location information and the terminal location information of the blocks BK1 and BK2 which are determined in accordance with the floorplan.

FIG. 4 is a flowchart for showing a processing example of a hierarchical layout in the first embodiment.

In the first place, by using input data such as a library stored in the database 5 in which a net list, a timing constraint, the shapes of cells, and timing at the full-chip level are preliminarily defined in the floorplan at the full-chip level, the arrangement locations of the cells and wiring routes (the arrangement of the cells and the wiring routes are collectively referred to as "physical information" hereinafter) for coupling the cells are estimated (step S101), and the shapes of the blocks and pin locations are determined on the basis of the physical information. At this time, each of the signal terminals of the blocks is arranged at an intersection point of the estimated signal line route and the boundary of the block.
hereafter, in a process of producing block layout data, the floorplan in the block is produced on the basis of the physical information estimated in the process of the step S101 (step S102).

At this time, a top wiring resource is set. Specifically, in the case where the signal line of the top passes through the block, the required number of tracks for the signal lines of the top is eliminated, or a wiring prohibition area with a ratio obtained by dividing the number of signal lines of the top by the number of available signal lines is set.

FIG. 5 is an explanatory diagram for showing an example of setting a top wiring resource.

When the top-block boundary simultaneous optimization is performed, the signal line of the top passes even in the hierarchy block existing in the previous step. If the top wiring resource is not considered at the time of the block layout, wiring congestion occurs in the top-block boundary simultaneous optimization.

As shown in FIG. 5, if the signal line for the top level (a signal line H1 of FIG. 5) passes through the block BK on the wiring route estimated in the process of the step S101, the top wiring resource is set at the time of producing the block P&R (block layout) data.

Figure 10:
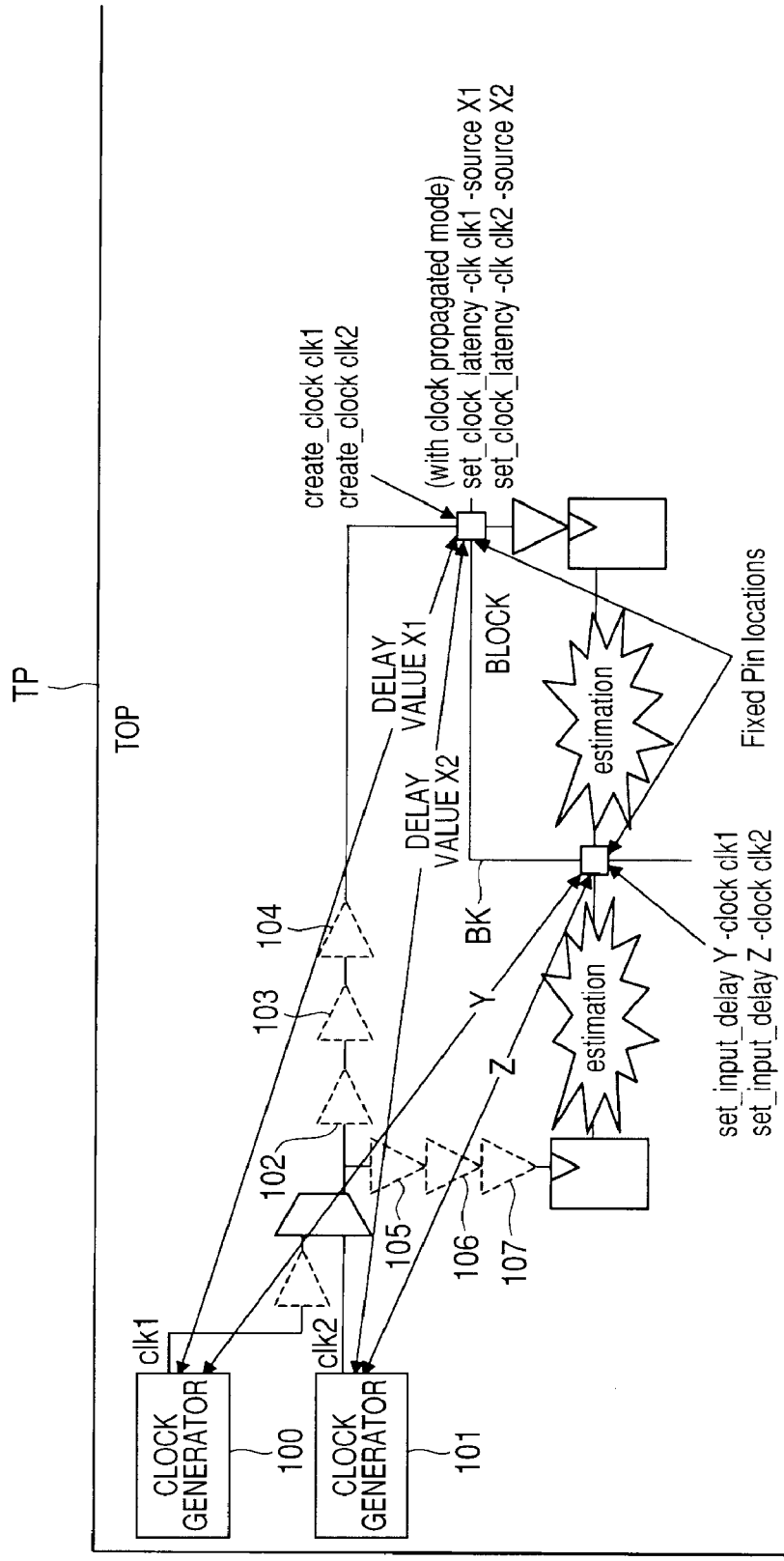
FIG. 10 is an explanatory diagram for showing problems when layouts of a top and a block in the hierarchical design method of FIG. 9 are separately processed.

Then, in a timing budget process, a path delay estimation ('estimation' of FIG. 10) is performed on the basis of the physical information in the process of the step S101, and necessary timing information is assigned to the inside and outside of the boundary of the block (step S103). As a result, a timing constraint file for the layout in the block such as a block SDC (Synopsys Design Constraint) is produced.

Thereafter, in a process of arrangement and wiring in the block, layout data in the block comprised of information of arrangements of elements and wiring, a block timing model, an ILM (Interface Logic Model) that is a logic related to the top and contains only RC (actual load data), and a TM (Timing Model) modeling the timing of the block are generated from the floorplan in the block in the process of the step S102 and the timing constraint file for the layout in the block in the process of the step S103 (step S104).

Thereafter, in a process of assembly block data, the layout data in the block in the process of the step S104 are allowed to be included in the layout data of the full chip (step S105).

In a process of deleting the boundary and the terminal of the block, the boundary of the block and the signal terminal location (block pin location) of the block which are produced in the process of the step S102 are deleted (step S106). Thereafter, a process of a trace boundary path is performed (step S107), and then unnecessary timing paths in the block are masked in inactivation of the paths in the block (step S108).

The reason for masking the unnecessary timing paths in the block is as follows. If the all timing paths in the block BK which reach and are coupled to the flip-flop FF are activated, almost all of the paths in the block are activated, and thus, reduction in memory usage and a processing time cannot be expected.

Here, the process of masking the unnecessary timing paths in the block performed in the steps S107 and S108 will be described using FIG. 6.

In the first place, the timing paths in the block are traced from the signal terminal D1 existing in the block layout as being illustrated. Then, if reaching the flip-flop FF, the tracing of the paths is stopped to set a flag indicating that the traced paths are activated.

Thereafter, among the paths in the block BK which reach and are coupled to the flip-flop FF, a flag for activating a path is set to the path that is critical in timing, and those other than the path to be activated are inactivated.

By setting the flag indicating which path is critical in timing in the layout of the block BK, it is not necessary to analyze the timing in the timing path inactivation step.

Thereafter, in a top-block boundary layout process, the simultaneous optimization (timing analysis and optimization are not performed for the inactivated paths in the block BK) of the boundary between the top TP and the block BK is performed (step S109), and the layout process at the full-chip level is completed.

Here, the simultaneous optimization is to determine the arrangement locations of the cells and the wiring routes while changing the circuits (inserting buffers, changing the driving capability, and remapping the cells (replacing with cells having different structures although the logic is the same) in order to satisfy the given timing constraint.

Thus, according to the first embodiment, it is possible to reduce a processing time and memory usage required for timing analysis by inactivating the timing information in the respective hierarchy blocks BK.

Further, during the timing optimization of the top TP, it is not necessary to read the result of the timing analysis in the block BK every time the circuit is updated, so that the processing time of the timing optimization process can be reduced.

Furthermore, by eliminating the physical boundary for producing the hierarchy block BK, the circuit logically existing in the top TP and the circuit existing in a different block BK can be freely arranged and optimized.

Second Embodiment

Figure 7:
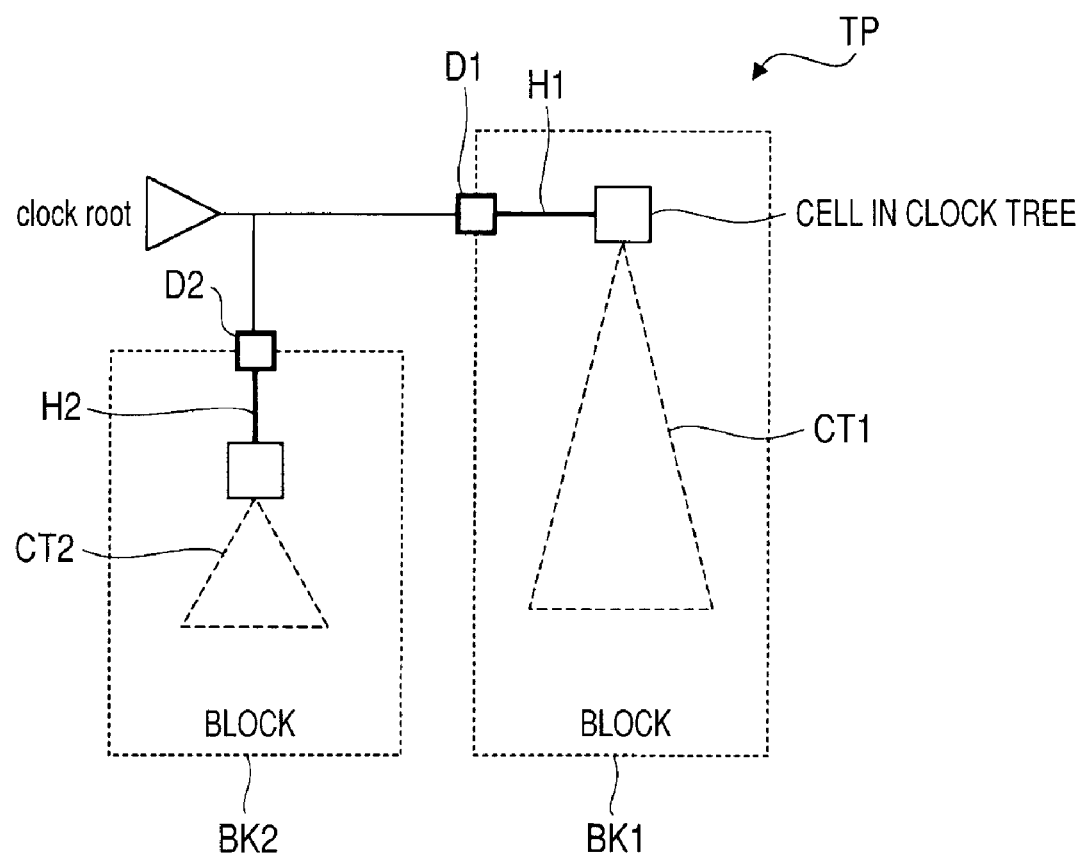
FIG. 7 is an explanatory diagram for showing an example of simultaneous optimization of boundaries between a top and blocks after clock trees are generated and signal lines are arranged only in the blocks according to a second embodiment of the present invention.

FIG. 7 is an explanatory diagram for showing an example of simultaneous optimization of boundaries between a top and blocks after clock trees are generated and signal lines are arranged only in the blocks according to a second embodiment of the present invention.

In the flowchart of FIG. 4 explained in the first embodiment, the clock trees are not particularly described. However, the same method can be applied to the clock trees even after the clock trees are generated and the signal lines are arranged in the blocks BK.

Specifically, clock trees CT1 and CT2 and signal lines H1 and H2 in the blocks BK1 and BK2 are retained, but the changes thereof are permitted during optimization. In the case where the clock trees CT1 and CT2 are already generated in the block BK1 and the block BK2, the clock trees in the blocks BK1 and BK2 that are already generated in the simultaneous layout of the boundaries between the top TP and the blocks BK1 and BK2 are used to produce the clock trees.

At this time, by permitting the changes during optimization, it is possible to optimize the clock trees irrespective of the starting points of the clock trees which are already existing in the block layout and are provided at the boundaries of the blocks in accordance with the floorplan at the full-chip level on the basis of the initial estimation.

FIG. 7 is an explanatory diagram for showing an example of the simultaneous optimization of the boundaries between the top and the blocks after the clock trees are generated and the signal lines are arranged only in the blocks.

As shown in FIG. 7, in order to arrange the cells and optimize the timing in the top TP, the clock trees CT1 and CT2 in the blocks BK1 and BK2 are retained (in accordance with setting of the flag) at the time of generating the clock trees in the top TP. In addition, the cells of the clock trees CT1 and CT2 in the blocks BK1 and BK2 and the clock signal lines H1 and H2 up to the signal terminals D1 and D2 set in the blocks BK1 and BK2 may be retained, or the clock signal lines H1 and H2 up to the signal terminals D1 and D2 set in the blocks may be deleted.

The timing optimization is performed by inactivating the timing information in the blocks BK as similar to the first embodiment.

Thus, according to the second embodiment, the clock trees CT1 and CT2 in the blocks BK1 and BK2 can be retained even after the clock trees CT1 and CT2 are generated and the clock signal lines H1 and H2 are arranged in the blocks BK1 and BK2, so that the re-budgeting step is not necessary and the processing time can be reduced.

Third Embodiment

Figure 8:
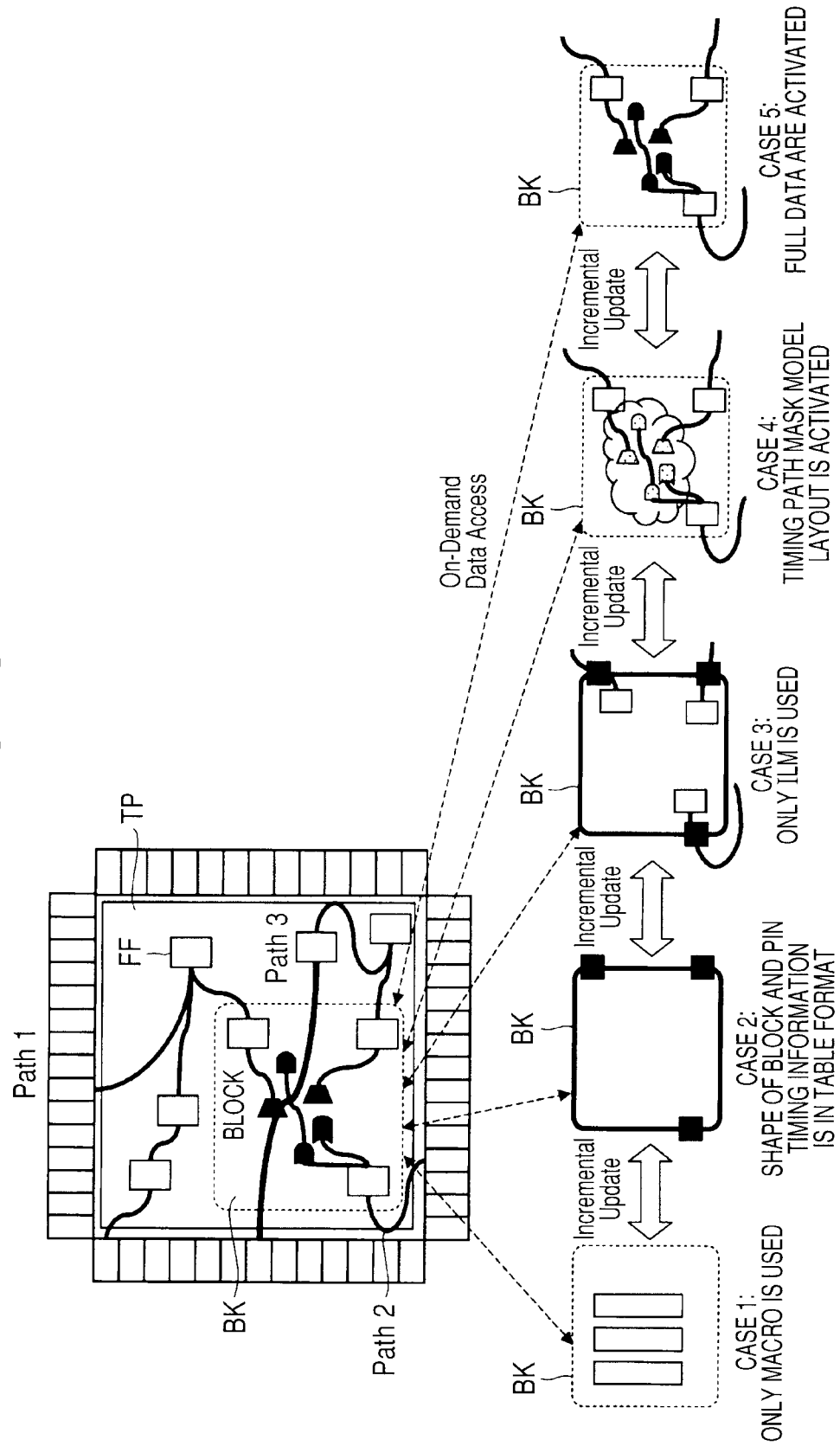
FIG. 8 is an explanatory diagram for showing an example of data management in a hierarchy layout process for inactivating unnecessary information according to a third embodiment of the present invention.
Figure 9:
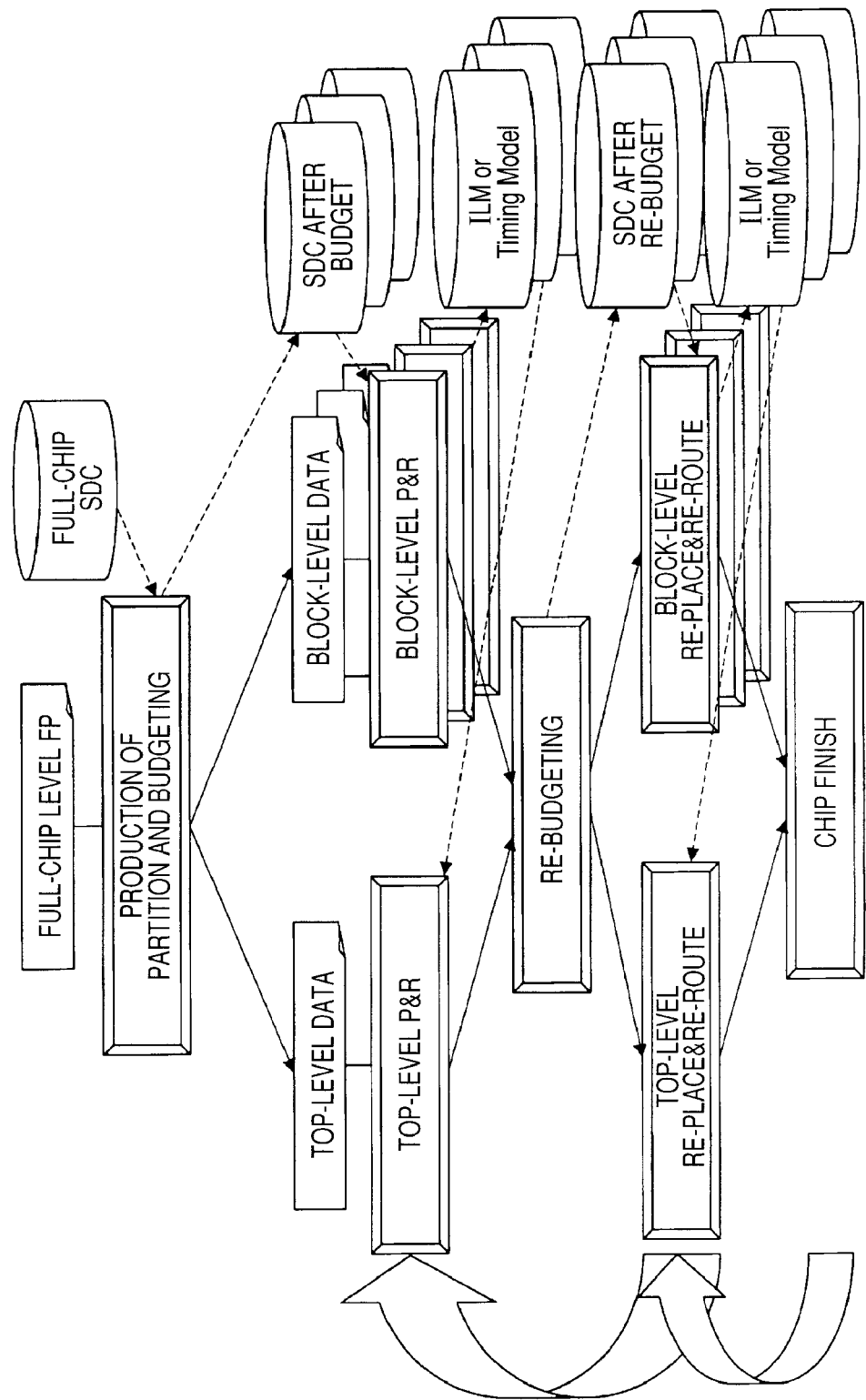
FIG. 9 is a flowchart for showing an example of a hierarchical design method in a semiconductor integrated circuit device studied by the inventors.

FIG. 8 is an explanatory diagram for showing an example data management in a hierarchy layout process for inactivating unnecessary information according to a third embodiment of the present invention.

In the first and second embodiments, inactivation of internal timing information of the block that is a low-order hierarchy of the top in the hierarchy layout design is described. From a different viewpoint, the present invention can be considered as a hierarchy layout design method in which necessary information is left and unnecessary information is inactivated. This will be explained using FIG. 8.

In a case 1 illustrated on the lower left side of FIG. 8, it is assumed that an electric power is designed, and a model including only a macro necessary for the electric power design is used in this case. The case 1 can be used in the process (the process of the step S101 of FIG. 4) of the floorplan at the full-chip level.

Further, in a case 2 illustrated on the right side of the case 1, it is assumed that the timing analysis and optimization for a path 1 unrelated to the block BK is performed, and only the location information of the signal terminals and the block BK is used in this case.

In a case 3 illustrated on the right side of the case 2, it is assumed that the timing analysis for a path 2 coupling the boundary portion between the top TP and the block BK is performed, and an ILM is used in this case. In a case 4 illustrated on the right side of the case 3, a timing path mask model is used when the layout of the path 2 at the boundary portion between the top TP and the block BK is optimized. Further, even in the case where the timing analysis for a path 3 coupled to the flip-flop FF of the top TP via the block BK is performed, the timing path mask model is used.

If the all cases 1 to 4 are necessary, full data of the block can be used as shown in a case 5 illustrated on the right side of the case 4. Further, the path 1, the path 2, and the path 3 can be simultaneously optimized, and in this case, the timing path mask model with a low level of abstraction is used or only the path 1 is used for a child process (an ILM or a black box is used for the block).

For example, in the process (step S103 of FIG. 4) of the timing budget, the timing path mask model is used for the target block, and an ILM or a black box is used for an unrelated block, so that memory usage can be reduced.

Further, if the layout and timing of the block BK are changed, the respective models are updated.

In the processes (steps S105 to S109 of FIG. 4) of the top-block boundary simultaneous optimization, the ILM can be used for the initial timing analysis (cases 3), and the case 2 or the case 4 can be used depending on whether or not the target path passes through the boundary of the block during the timing optimization.

Accordingly, the processing time and memory usage in the hierarchy layout design can be reduced even in the third embodiment.

The present invention achieved by the inventors has been concretely described on the basis of the embodiments. However, it is obvious that the present invention is not limited to the above-described embodiments, but may be changed in various ways within the scope of the present invention.

The present invention is suitable for an automatic layout design technique of a semiconductor integrated circuit device.

What is claimed is:

1. A computer-implemented method for designing a semiconductor integrated circuit device layout by dividing design data of an entire chip into hierarchically-arranged design data of a top block and design data of a plurality of lower-order blocks, the method comprising:
performing by a processor a boundary simultaneous optimization process in which the layout of a timing path used for timing optimization is designed only at boundaries between the top block and the lower-order blocks,
wherein the boundary-simultaneous optimization process is performed in a state in which circuits and signal lines belonging to a top block are temporarily arranged, and signal lines, the operation timing of circuits, and location and routing arrangements in the lower-order blocks are optimized,
wherein, in order to couple a first signal line between the circuit belonging to the top block and a signal terminal belonging to one of the lower-order blocks, the boundary simultaneous optimization process is performed in a state where location information of the signal terminal is deleted before the first signal line is coupled, and
wherein the boundary simultaneous optimization process is performed in a state where location information of the boundaries of the top block and the lower-order blocks is deleted.

2. The method according to claim 1,
wherein, in order to couple a second signal line between the signal terminal belonging to one said block and the circuit belonging to said block, the boundary simultaneous optimization process is performed in a state where the location information of the signal terminal is deleted before the second signal line is coupled.

3. A non-transitory computer readable storage medium upon which is embodied a sequence of programmable instructions that, when executed by a processor, cause the processor to design a layout by dividing design data of an entire chip into design data of a top block and design data of a plurality of other blocks, comprising the steps of:
determining the shapes of blocks and pin locations on the basis of physical information comprised of arrangement locations of cells and signal line routes for coupling the cells, the physical information being estimated by using data such as a library in which a net list, a timing constraint, the shapes of the cells and timing are preliminarily defined at the full-chip level;
producing a block floorplan on the basis of the physical information;
estimating a timing constraint file for a layout of blocks by estimating a path delay and assigning necessary timing information to insides and outsides of boundaries of blocks on the basis of the physical information;
generating arrangement and wiring information from the block floorplan and the timing constraint file for the layout of the blocks;
allowing layout data of the blocks included in the arrangement and wiring information to be included in the layout data of the full chip;
deleting the boundaries of blocks and block pin locations from the physical information;
activating timing paths which are traced in the blocks from a signal terminal existing in the layouts of the blocks and reach a flip-flop;
activating one of said timing paths which is critical in timing among those of the blocks that reach and are coupled to the flip-flop;
inactivating timing paths other than the one that is critical in timing; and
performing a simultaneous optimization process of the boundaries between the top block and the other blocks.

4. The non-transitory computer readable storage medium according claim 3,
wherein the step of generating a block floorplan on the basis of the physical information includes a step of deleting a required number of tracks for signals lines of the top block when the signal lines of the top block pass through at least one of said other blocks.

5. The non-transitory computer readable storage medium according claim 3,
wherein the step of generating a block floorplan on the basis of the physical information includes a step of setting a wiring prohibition area with a ratio obtained by dividing the number of signal lines by the number of available signal lines when the signal lines of the top block pass through at least one of said other blocks.

* * * * *